United States Patent Office 3,159,639
Patented Dec. 1, 1964

3,159,639
CATALYTIC HYDROGENATION OF PYRIDYL-
CARBOXYLIC ACIDS AND PYRIDYLALKYL-
CARBOXYLIC ACIDS
Morris Freifelder, Waukegan, Ill., assignor to Abbott
Laboratories, North Chicago, Ill., a corporation of
Illinois
No Drawing. Filed Sept. 17, 1962, Ser. No. 224,201
7 Claims. (Cl. 260—293.2)

The present invention is concerned with a catalytic hydrogenation. More particularly, it is concerned with the preparation of piperidylcarboxylic acids and C-piperidylalkanoic acids by direct hydrogenation of the corresponding pyridylcarboxylic acid and pyridylalkanoic acids.

In short, the present invention is concerned with the following reaction:

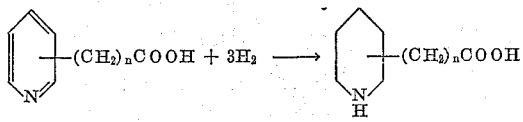

wherein $n$ is an integer from 0 to 5 inclusive.

It is known from the prior art that in the process of catalytically hydrogenating nicotinic acid in water, decarboxylation occurs and only a very small amount of nipecotic acid is obtained. 2-pyridyl- and 4-pyridylacetic acids have also been found to be notably unstable. β-2-pyridylpropionic acid undergoes decarboxylation even when a solution thereof is concentrated. When nicotinic acid is reduced in the presence of a platinum catalyst and acetic acid, considerable decarboxylation takes place, as reported by Sorm in Collection of Czecholovak Chemical Communications, volume 13, page 57 (1948). Even in the presence of hydrochloric acid, 10% of piperidine is obtained, resulting from decarboxylation during reduction. The only successful hydrogenation of nicotinic acid without decarboxylation reported involves catalytic reduction of the sodium salt. Since the free nicotinic acid is very soluble in water and insoluble in organic solvents, neutralization of the sodium salt and subsequent isolation of the free acid is extremely difficult. If the sodium salt of nipecotic acid is neutralized with an inorganic acid, the free acid does not precipitate. If the solution is then concentrated, the acid is contaminated with the sodium salt of the inorganic acid from which it cannot be freed in a simple manner. In the preparation of piperidylacetic acids or β-piperidylpropionic acids, the same problem is involved. The same difficulty is also encountered when the hydrochloride salts of the above unsaturated acids are reduced.

It is therefore an object of the present invention to provide a new and novel process for the direct preparation of free nipecotic acid and free C-piperidylalkanoic acids. It is another object of the present invention to provide a new method producing high yields of free nipecotic acid and free C-piperidylalkanoic acids by hydrogenating the corresponding heteroaromatic carboxylic acid. It is a further object of the present invention to provide a method for hydrogenating nicotinic acid and pyridylalkanoic acids and obtaining the corresponding free piperidyl acids in a single step. A still further object of the present invention is the provision of a process for hydrogenating nicotinic acid and pyridylalkanoic acids which prevents decarboxylation.

These and other objects are accomplished by hydrogenating free nicotinic acid or free pyridylalkanoic acids in the presence of a rhodium catalyst and ammonia. In this manner, the above difficulties are circumvented, i.e., no decarboxylation takes place and no isolation difficulties arise: nipecotic acid or piperidylalkanoic acids are obtained in excellent yields upon evaporation of the water used as the hydrogenation medium. No purification is necessary since the residue from the evaporation is the desired product of excellent purity.

In a simple embodiment of the present invention, an aqueous solution of nicotinic acid is hydrogenated in the presence of a rhodium catalyst and in the presence of at least an equimolar amount of ammonia. The hydrogenation can be carried out within a temperature range of between 0° and 100° C. and at a pressure between atmospheric pressure and 1000 atmospheres, or even higher. However, since the process of the present invention can be carried out at an excellent hydrogenation rate, producing good yields at room temperature and between 1 and 3 atmospheres of hydrogen pressure, no particular need is seen for using high temperatures and high pressures. Thus, the process can be carried out in so-called low-pressure equipment such as a Parr-shaker, an ordinary round flask, or a still.

The present invention is better understood by reference to the following examples which are given here only to illustrate the method outlined above. These examples should in no way be construed as limiting the invention in any respect.

EXAMPLE 1

Nipecotic Acid

A suspension of 6.15 grams of nicotinic acid in 50 cc. of water is placed in a Parr-shaker together with 5.5 cc. of concentrated aqueous ammonia. To this solution is added 2.4 grams of a catalyst consisting of 5% rhodium on alumina and it is hydrogenated at room temperature and 2 atmospheres of hydrogen pressure. Hydrogen uptake is completed in less than 4 hours. The catalyst is filtered off and the filtrate is concentrated to dryness under reduced pressure. To insure complete removal of water, the residue is treated with pure anhydrous benzene and reconcentrated. A dry residue of 5.7 grams of nipecotic acid (corresponding to a yield of 88.5% of theory) is obtained. The product shows a melting point of 260–261° C. and infrared examination shows that the product is identical to a known standard sample. A mixed melting point with an authentic sample shows no depression and the chemical analysis is in exact agreement with the calculated values for nipecotic acid.

EXAMPLE 2

Pipecolic Acid

By following the procedure described in Example 1 but replacing nicotinic acid with picolinic acid, pipecolic acid melting at 276° C. is obtained in excellent yield. A mixed melting point with a standard sample shows no depression.

EXAMPLE 3

Isonipecotic Acid

By following the procedure of Example 1 but using isonicotinic acid as the starting material, isonipecotic acid melting at 336° C. is obtained in good yield.

EXAMPLE 4

4-Piperidylacetic Acid

An aqueous solution of 2.5 grams of pyridylacetic acid hydrochloride is passed through a column of Amberlite IR-120 resin. The column is eluted with 2.5% aqueous ammonia, and the eluate is evaporated under reduced pressure without heating. The dry material is dissolved in cold water and hydrogenated at a pressure of 2 atmospheres in the presence of 1.0 gram of a catalyst consisting of 5% rhodium on carbon. After completion of the hydrogen uptake, the catalyst is filtered off and the filtrate is evaporated under reduced pressure. 4-piperidylacetic acid is obtained in a yield of 64.5% of theory. Infrared spectrum and elemental analysis of the compound obtained are both in agreement with the known values for 4-piperidylacetic acid.

EXAMPLE 5

β-3-Piperidylpropionic Acid

A mixture of 7.55 grams of β-(3-pyridyl)propionic acid in 100 cc. of water and 5 cc. of 29% aqueous ammonia is hydrogenated in the presence of 2.5 grams of 5% rhodium on carbon at a hydrogen pressure of 2.5 atmospheres at room temperature. After hydrogen uptake is completed, the solution is filtered and the filtrate is concentrated under reduced pressure to leave a residue corresponding to 94% of theory of β-3-piperidylpropionic acid, melting at 180–181° C. Chemical analysis of this compound is in close agreement with the calculated values for $C_8H_{15}NO_2$.

EXAMPLE 6

β-4-Piperidylpropionic Acid

By following the procedure of Example 5 but using β-(4-pyridyl)propionic acid as the starting material, β-4-piperidylpropionic acid is obtained in a yield of 89% of theory, melting at 275–277° C. Chemical analysis is in agreement with the calculated values for $C_8H_{15}NO_2$.

From the above examples it will be seen that excellent yields are obtained by this very simple one-step process for obtaining both C-piperidylcarboxylic acids and C-piperidylalkanoic acids without danger of decarboxylation and without going through a salt preparation and complicated isolation process. The catalyst used in the present invention is rhodium which can be unsupported or supported by a common carrier such as carbon, alumina, silica, bentonite, etc. The catalyst may be in the form of powder, crystals, pellets, chunks, etc. and is preferably used in an amount of from 0.5% to 5.0% of metallic rhodium per weight of the starting material used. Of course, a catalyst amount outside the above range may be used but when this amount is below 0.5%, hydrogen uptake is somewhat slower than practical and where larger amounts are used, the additional amount will not appreciably increase the reaction speed. In fact, the hydrogenation in the presence of 2–5% rhodium is so rapid that the process can be carried out in a continuous manner.

The process of the present invention is carried out in the presence of at least one equimolar amount of ammonia. The amount of ammonia above the equimolar amount is of no consequence but no advantage is seen in using more than a 10-fold excess. Excellent results are obtained if ammonia is present in an amount between 1.0 and 2.0 moles per mole of starting material.

One of the advantages of the present invention is the high yield of piperidylcarboxylic acids or piperidylalkanoic acids obtained. A further advantage of the present invention is the high quality and purity of the above acids obtained in a single-step process. The present process produces almost quantitative yields of extremely pure material in a fast reaction involving only a catalyst, water and ammonia. Thus, this process is highly economical, particularly since the catalyst can be reused and no recrystallization is necessary for the end product.

Others may practice the invention in any of the various ways which will be suggested to one skilled in the art by the present disclosure. All such practice of the invention shall be considered a part thereof provided it falls within the scope of the appended claims.

I claim:

1. The process of hydrogenating a heteroaromatic acid of the formula

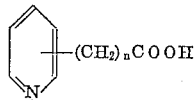

wherein $n$ is an integer from 0 to 5 inclusive, to the corresponding ring-saturated acid, consisting essentially in
 hydrogenating an aqueous solution of said heteroaromatic acid in the presence of from 0.5% to 5.0% of metallic rhodium and in the presence of at least an equimolar amount of ammonia
 at a temperature between 0° and 100° C. and at a hydrogen pressure between atmospheric pressure and 1000 atmospheres until 3 moles of hydrogen are absorbed per mole of said heteroaromatic acid.

2. The process of preparing an acid of the formula

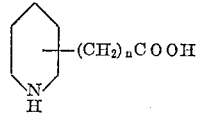

wherein $n$ is an integer from 0 to 5 inclusive, consisting essentially in
 hydrogenating an aqueous solution of the corresponding heteroaromatic acid in the presence of a rhodium catalyst wherein said rhodium is present in an amount of from 0.5% to 5.0% based on said heteroaromatic acid and in the presence of at least an equimolar amount of ammonia at a temperature between 0° and 100° C. and at a hydrogen pressure between atmospheric pressure and 1000 atmospheres,
 removing said catalyst after 3 moles of hydrogen are absorbed, and
 evaporating said aqueous solution to dryness.

3. The process of claim 2 wherein said heteroaromatic acid is nicotinic acid.

4. The process of claim 2 wherein said rhodium catalyst is supported by a carrier.

5. The process of claim 4 wherein said carrier is carbon.

6. The process of claim 4 wherein said carrier is alumina.

7. The process of claim 2 wherein said hydrogenation is carried out at room temperature and at a hydrogen pressure between 0 and 100 p.s.i.g.

References Cited in the file of this patent

UNITED STATES PATENTS

| | | |
|---|---|---|
| 2,019,419 | Lazier | Oct. 29, 1935 |
| 2,675,390 | Rosenblatt | Apr. 13, 1954 |
| 3,051,715 | Biel et al. | Aug. 28, 1962 |

OTHER REFERENCES

Barnes et al.: Jour. Am. Chem. Soc., vol. 49, pages 1307–1315 (1927).

Klingsberg: Heterocyclic Compounds—Pyridine and Derivatives, Part Three, Chapters IX–XII, pages 202–203 (1962), Interscience Publishers.